United States Patent [19]
Schroppel

[11] Patent Number: 5,255,882
[45] Date of Patent: Oct. 26, 1993

[54] SETTING DEVICE WITH A NUT CONTROLLABLE BY A SPINDLE

[75] Inventor: Werner Schroppel, Wendelstein, Fed. Rep. of Germany

[73] Assignee: Diehl GmbH & Co., Nürnberg, Fed. Rep. of Germany

[21] Appl. No.: 713,829

[22] Filed: Jun. 12, 1991

[30] Foreign Application Priority Data

Jun. 19, 1990 [DE] Fed. Rep. of Germany ....... 4019482

[51] Int. Cl.$^5$ ............................................... F42B 10/64
[52] U.S. Cl. .................................. 244/3.24; 74/89.15; 74/424.8 R; 192/141
[58] Field of Search ................... 244/3.24, 3.23, 3.26, 244/3.27, 3.28, 3.29; 74/424.8 R, 89.15; 192/141

[56] References Cited

U.S. PATENT DOCUMENTS

| | | | |
|---|---|---|---|
| 2,944,436 | 7/1960 | Pickles | 74/424.8 R |
| 2,944,437 | 7/1960 | Pickles | 192/141 |
| 4,364,531 | 12/1982 | Knoski | 244/3.27 |
| 4,575,025 | 3/1986 | Sadvary et al. | 244/3.27 |
| 4,795,110 | 1/1989 | Lang | 244/3.24 |
| 4,858,481 | 8/1989 | Abraham | 74/89.15 |
| 4,872,903 | 10/1989 | Periou | 74/89.15 |
| 5,040,745 | 8/1991 | Oswald et al. | 244/3.21 |

FOREIGN PATENT DOCUMENTS 1065241 9/1959 Fed. Rep. of Germany.
3702733 8/1988 Fed. Rep. of Germany.

*Primary Examiner*—Michael J. Carone
*Attorney, Agent, or Firm*—Scully, Scott, Murphy & Presser

[57] ABSTRACT

A setting device for the control surface of a projectile, which includes a drivable spindle or actuated screw which is screwed through the intermediary of a nut which is secured against rotation. Included are end stops for limiting the axial extent of displacement of the nut when stop surfaces which rotate in conjunction with the spindle contact in the direction of rotational movement, a stop against a stop surface axially-parallel protruding from a single-threaded helicoid surface on one or the other end face of the nut.

9 Claims, 2 Drawing Sheets

SETTING DEVICE WITH A NUT CONTROLLABLE BY A SPINDLE

BACKGROUND OF THE INVENTION

1. Field of the Invention

The present invention relates to a setting device for the control surface of a projectile, which includes a drivable spindle or actuated screw which is screwed through the intermediary of a nut which is secured against rotation, and including end stops for limiting the axial extent of displacement of the nut when stop surfaces which rotate in conjunction with the spindle contact in the direction of rotational movement, a stop against a stop surface axially-parallel protruding from a single-threaded helicoid surface on one or the other end face of the nut.

2. Discussion of the Prior Art

A setting device of the foregoing type has become generally known from the disclosure of German Published Patent Appln. 1 065 241 as a so-called screw drive which; for instance, is employed for the actuation of positioning or setting installations. The movement of the nut along the spindle or actuated screw is limited by means of pins which engage radially into the screwthreads of the spindle, against which there presently comes into contact a shoulder on the end surface of the nut along the circumferential direction of the spindle, so as to avoid an axial wedging between contact surfaces. The foregoing also applies to the non-jamming actuated screw and nut combination which is disclosed in U.S. Pat. No. 2,944,436.

In contrast therewith, in a setting device for control surfaces as disclosed in German Laid-Open Patent Appln. 37 02 733, there is encountered the danger that the running nut and, as a consequence, the operational component which is adjusted or controlled thereby (in that instance the control surface of a projectile) will remain caught in the one or the other end position and, as a result, lead to serious adverse influences over the functioning thereof, inasmuch as the screwthreads of nut are too excessively tightened against the screwthreads of the spindle or actuated screw, when the contact surfaces additionally provided at that location and which extend at the end surfaces transversely of the longitudinal axis of the spindle, are brought into contact with each other; for example, at a high rate of speed. Resultingly, the high kinetic energy of the displaced masses are converted into a tightening torque of the nut against the corresponding facing or mating surface, so that quite possibly the torque of the drive motor for effectuating the spindle-driven nut movement will together no longer be adequate to be able to again release this reciprocal tightening.

Such kinetic conditions are not encountered, when there is selected a contacting movement with the least possible axial components, as in the case of a contact movement which is oriented in a circumferential direction so as not to cause any bracing of the paired screwthreads, but at an oppositely directed driving motion, the contact surface can again simply lift away from each other transversely of the longitudinal direction of the spindle. In any event, it is critical that in order to overcome higher forces (especially such as are encountered during the setting of the control surfaces of rapidly-flying projectiles or missiles) so as to avoid the end stopping-jamming effect encountered in the prior art of the type described herein weakening the structure of the setting spindle due to radially inwardly engaging contact pins, and also the dynamic stressability of such pins against contact surfaces oncoming at full setting speed and under a high load is, at the very least, critical. Thus, it is possible to implement braking measures, but this would restrict the usable extent of setting for the running nut, and necessitate the employment of additional, functionally critical, as well as complex assembling measures.

SUMMARY OF THE INVENTION

Accordingly, it is an object of the present invention to provide a setting device of the above-mentioned type, which facilitates the implementation of a miniaturized or small-sized non-jamming restriction in the movement of a running nut for a spindle or actuated screw with a high degree of operational dependability, irrespective of the speed of approach of the nut to the stop, such that the setting device can also, in particular, be employed for the setting and maintaining in position of control surfaces for projectiles which are most highly stressable from the standpoint of flow-dynamics, and which are introducible into the smallest installation spaces.

The foregoing object is inventively attained in that the positioning device or setting device of the type pursuant to the invention with regard to the contact surfaces of the nut, there are formed complementary contact surfaces on the end surfaces facing towards the nut by means of axially adjustable stops which are secured against rotation on the spindle, and which upon contacting of the contact surfaces presently engage with a radially narrowing front segment into a recess formed in an end surface on the nut.

Such a construction avoids the danger of the spindle fracturing due to a weakening caused by means of laterally-introduced contact or limit pins and, in particular, is especially highly stressable inasmuch as the contact surfaces which presently cooperate in a paired manner in the direction of the spindle axis, and transversely thereof can be designed to be extremely large in size so that, notwithstanding only small specific surface loads, there can be assumed large forces and transmitted to the supporting spindle dispersed over a large surface. The unstressed tangential contact of the movement limiting surfaces; in effect, oriented along the direction of the pitch of the screwthreads between the spindle or actuated screw and the running nut, without any substantial increase in the constructional volume facilitates the full utilization of the extent of the nut displacement, without necessitating any installation space for braking media which, at a simple pin contact, would not be feasible for the herein encountered loading conditions.

In contrast with the pin contact which must be positioned constructively specified manner, the end stop which is always adjustable along the spindle pursuant to the present invention, facilitates that the contact surface which are located in a longitudinal middle plane extending through the spindle axis be fixed in such a position on the spindle so as to ensure a largest possible surface superposition of the cooperating contact surfaces even still without any touching of the mutually single-threaded helicoid surfaces, so as to securely avoid functionally-disturbing deformations caused by overstressing of material at only slight surface superposition.

This adjustability is constructively implementable in an especially simple manner, and thereby functionally most reliable, when the end stop for the running nut which is fastened to the apparatus; in essence, that carried by the spindle, is presently divided into two parts in the type of a pair of lock nuts. For effecting the adjustability of the respective end stop; in essence, for the turning and securing of the contact part on the spindle screwthread which faces the nut, the parts can be equipped with peripheral surfaces for the application of screw spaners or with cutouts for socket wrenches so that there can be carried out an especially delicately sensitive positioning and secure reversing of the contact.

The settability for the fine adjustment of the end stops; however, is also implementable in that each end stop is prestressed in a specified manner against a shaft shoulder which is provided on the spindle. Hereby, the tightening torque influences the axial position of the respective contact surface. Hereby, the tightening torques do not vary extremely, extensively inasmuch as the extent of displacement which is necessary in order to create the mentioned large-surfaced contact between cooperating surfaces, is determined by a single course or pitch of screwthread.

Basically, in carrying out the inventive object, provision can additionally be made that behind the end stop there is inserted an element consisting of a deformable material, which is constructed somewhat as a shim or washer which, during the course of the adjustment along the screwthread of the spindle in an axial direction, is subjected to compression. This renders easier an extremely exact positioning of the effective contact or stop surface and possesses the added advantage of damping the impact of the nut which is oncoming with a high kinetic energy, which assists in the avoidance of deformations and fractures in the region of the force-assuming stop surfaces.

In order to maintain the longitudinal stresses of the paired threads between the the spindle and the stop nut within bounds, it is intended to be able to obtain an axially as long as possible guidance of the screwthreads of the spindle within the nut; however, which would increase the axial dimension of this setting device in an undesirable manner. Nevertheless, this can be compensated for in that, inventively, one of the constructional elements which come into interaction upon contact, preferably the running nut, is formed with a coaxial recess at an end surface thereof, into which the other element engages so as to be resultingly imparted a correspondingly lengthened guidance for the screwthreads. The collar which radially borders the recess possesses at its end surface the single-threaded helicoid surface, whose ends are interconnected by means of the tangentially oriented contact or stop surface. When these recesses are formed at both end surfaces of the nut, then there is also obtained the functional advantage of a reduced friction of the screwthreads due to axial shortening of the thread within the nut. The location of the effective stop or contact surfaces at a relatively large distance from the spindle axis; namely, axially externally of the recess and the herein engaging complementary element, due to the lengthy lever arm brings about a high stressability during the assumption of the forces which are generated by the running up nut.

For the remainder, the nut is designed for an eccentric assumption of force by means of a preferably integrally formed extension, which extends through a guide slot formed a sleeve encompassing the spindle, and thereby concurrently acts as a security against rotation of the nut at a rotating spindle.

Preferably, a pair of fingers with mutually parallel inner shank surfaces which transmits the torque to the control surface shaft engages about spherical mating surfaces of an actuating extension which projects radially away from the nut whereby, for effecting a reduction in the surface pressure, each of the these two spherical surfaces possesses a radius which is larger than one-half the intermediate inner spacing between the parallel finger surfaces. Located between these spherical contact surfaces which are positioned along the spindle direction and the nut itself is thusly an undercut connecting section of the extension which radially engages through the slot in the sleeve. In order to be also able to control maximum torques which are encountered in the area of the end position of the nut; in essence, at a wide incidence or setting angles for the control surfaces, the shape in the sides of the spherical extension can be so selected that as a result of the rolling down movement of the linear over the spherical surface, at an increasing lateral deflection there increases the speed reduction ratio. The forces which act on the shaft, and which are to be assumed by the running nut, are transmitted at a good degree of efficiency across the spherical rolling down surfaces of the extension. Neither the degree of efficiency nor the rotational action is influenced by the axial spacing between the nut and the shaft. A worm drive-coupling, in contrast therewith, must possess an extremely small module in order to be able to be located within in the same space which; however, already at a small change in the axial spacing, will lead to either a jamming or to an impermissible degree of play. Already due to elastic deformation of the mechanically highly-stressed structural components, can the above-mentioned axial distances not be constantly maintained in actual practice. Consequently, in this instance, instead of usual involute-tooth system or a usual worm gear drive, there is constructed the undercut extension pursuant to the contemplated extent of setting.

Through the selection of an automatically locking drive mechanism for the screw-type drive constituted of the nut and the actuated screw or spindle, it is possible to prevent a turning of the external shaft and thereby; for instance, of the therewith interconnected aerodynamic control surface at inactive operating conditions of the setting system, respectively, during the unguided phases of flight. This eliminates the need for supplying complex measures for arresting the shaft which is to be adjusted by means of the running shaft-extension, as well as any electro-mechanical holding brake. As the screwthread for this screw-type drive, a V-thread comes above all into consideration. In comparison with a spherical gear drive, a V-thread drive has, in essence, a substantially higher carrying capacity at a smaller installation space, and is also more inexpensively producible and already possesses the expedient automatic locking aspect.

BRIEF DESCRIPTION OF THE DRAWINGS

Further features and advantages of the invention can now be more readily ascertained from the following detailed description of an exemplary embodiment of the inventive setting device, taken in conjunction with the accompanying drawings; in which.

DETAILED DESCRIPTION

Figure 1:
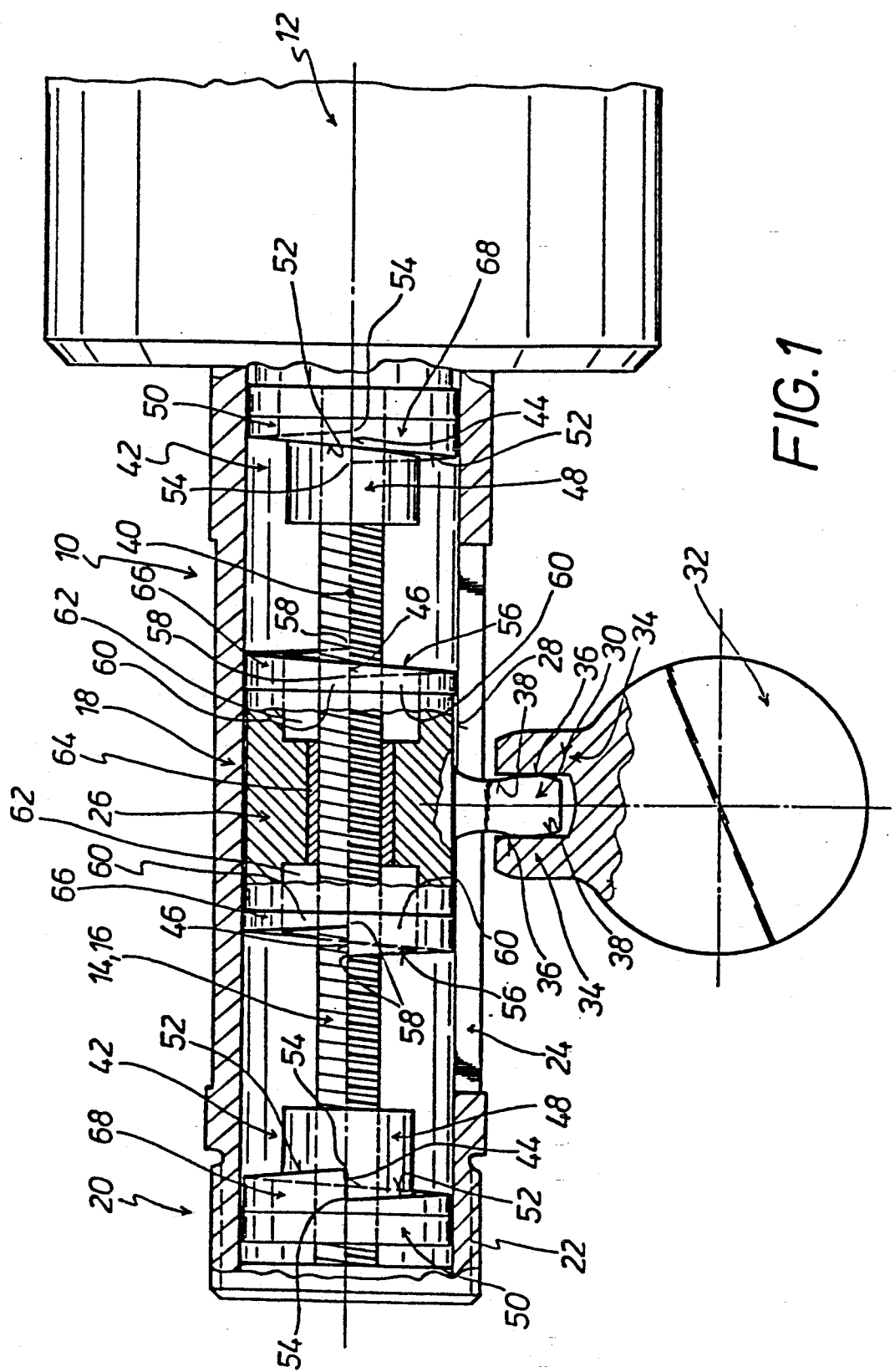
FIG. 1 illustrates a partially-sectioned longitudinal view of the inventive setting device.

FIG. 1 illustrates, in a partially sectional, longitudinal view, a setting device 10 for a control surface or stabilizing fin of a projectile. A fragmentary illustrated drive motor 12 drives a spindle or actuated screw 14 possessing an external screw thread 16. The setting device 10 additionally possesses a sleeve 18 which is fastened to the motor 12, which concentrically encompasses the spindle 14 and at the end section 20 thereof which is distant from the motor 12 is equipped with an external screw-threaded section 22 for mounting purposes. Through the use of a pin 72 (FIG. 2) there is provided a security against rotation on the motor 12. The sleeve 18 is additionally formed with an elongate slot 24 which extends in the axial direction of the sleeve 18.

The spindle 14 extends through a nut 26 which has a protuberance or extension 30 projecting from the outer surface 28 thereof. The extension 30 is preferably integrally formed with the nut 26.

Reference numeral 32 identifies a shaft for a control surface from which two fingers 34 extend at a spacing from each other. The fingers 34 possess mutually facing parallel surfaces 36 which lie against mating spherical complementary surfaces 38 on the extension 30 which projects from the nut 26. A detailed description of the fingers 34 which form a fork and the protuberance or extension 30 which projects radially from the nut 26 is set forth in detail hereinbelow. Through the equipping of the extension 30 and the two fingers 34 with suitable surfaces 36 and, respectively 38, an axial displacement of the nut 26 along the spindle 14 produces a rotational movement of the shaft 32 for the control surface in either the clockwise direction or in the opposite counterclockwise direction.

The extension 30 passes through the slot 24 which is formed in the sleeve 18, such that the nut 26 is prevented from carrying out a rotation about the central longitudinal middle line 40 or, respectively, about the spindle 14. A rotation of the spindle 14 about the central longitudinal center line 40, which is produced by the drive motor 12 for the control surface setting device 10, resultingly produces a linear adjusting or displacement movement of the nut 26 and, consequently, produces a rotation of the control surface shaft 32.

In order to limit the axial extent of displacement of the nut 26 relative to the spindle 14, there are provided two end stops 42. The end stops 42 are arranged in an adjustable and fixable manner on the spindle 14. For this purpose, the end stops 42 are preferably constructed as lock nuts. Each end stop 42 is provided with a contact surface 44. The contact surfaces 44 are preferably oriented in a radial plane which contains the central longitudinal axis 40. The nut 26 is formed with complementary contact surfaces 46, which are oriented in the same manner as the contact surfaces 44 of the end stops 42; in essence, oriented in radial planes, which contain the central longitudinal middle line 40. Each end stop 42 possess a first segment 48 and a second segment 50 axially attached thereto, whereby the second segment 50 possesses a larger diameter than the therewith associated first segment 48. The transition or, in essence, end surface of each end stop 42 which provides the transition between the first segment 48 and the second segment 50 is constructed as a single screwthreaded surface 52 whose both ends 54 are interconnected by means of the complementary contact surface 44. The nut 26 is formed at its two oppositely facing end surfaces with corresponding single screwthreaded surfaces 56, whose ends 58 are interconnected by means of the associated complementary contact surface 46. The threaded surfaces 56 presently border a flange 60 located on the nut. Each flange 60 borders in an axial direction a recess 62 at the end surface in the nut 26, whereby the internal diameter of each recess 62 is larger than the diameter of the first segment 48 of each end stop 42, so that the nut 26 is axially relatively movable over the first segment 48 until the complementary contact surface 46 of the nut 26 lies in large surface contact with the contact surface 44 of the corresponding end stop 42. The screwthreaded surfaces 52 and 56 are constructed in such a manner that they will not touch even in the corresponding end position of the nut 26, so as to assuredly avoid any clamping or jamming of the nut 26 on the spindle 14 in either one or the other end position.

Each end stop 42 is provided with a setting component (not shown), which may consist of recesses of specified key widths for the insertion of a torque wrench or to diametrically oppositely located planar-parallel surfaces of specified wrench widths.

The nut 26 is provided in the axially narrowing part between the two recesses 62 with a threaded insert 64 consisting of a friction-lowering material. Moreover, the nut is equipped at both end surfaces of the segments with rings 66 of a friction-lowering or reducing material, whereby each of the two rings 66 forms at least a portion of the corresponding flange 60. The rings 66 which project radially beyond the jacket surface of the nut 26 contact the internal surface of the sleeve 18 with a sliding fit, and serve for the linear guidance of the nut 26 in the axial direction of the sleeve 18. The rings 66, if required, can be equipped with helicoid surfaces 56 of the nut 26. Correspondingly, the two end stops 42 can also be formed with ring 68 of a friction-lowering or reducing material, which possess the helicoid surfaces 52 and the contact or stop surface 44. With regard to this friction-reducing material, this can relate; for example, to a bronze. The end stops 42 each possess external dimensions which are smaller than the small internal dimensions of the sleeve 18.

The protuberance or extension 30 which is located on the nut 26, as has been already previously mentioned, possesses two complementary surfaces or, respectively, sides 38 on which there roll the fingers 34 of the control surface shaft 32. The fingers 34 which form a follower yoke possess surfaces 36 which extend in parallel with each other. The sides 38 of the extension 30 each possess a radius whose center of curvature each lies on a plane which is parallel to the threaded spindle 14. The position of the aerodynamic control surface relative to the axis of rotation of the respective control surface shaft 32 is selected such that during the active guided operation of the system, the aerodynamic flow forces produce, with regard to the inoperative position of the control surface (setting angle=0°) a retrograde moment. The flow of power is effected in this manner always by means of a side 38 of the extension 30. This provides a good degree of efficiency and a high carrying capacity or bearing strength.

Figure 2:
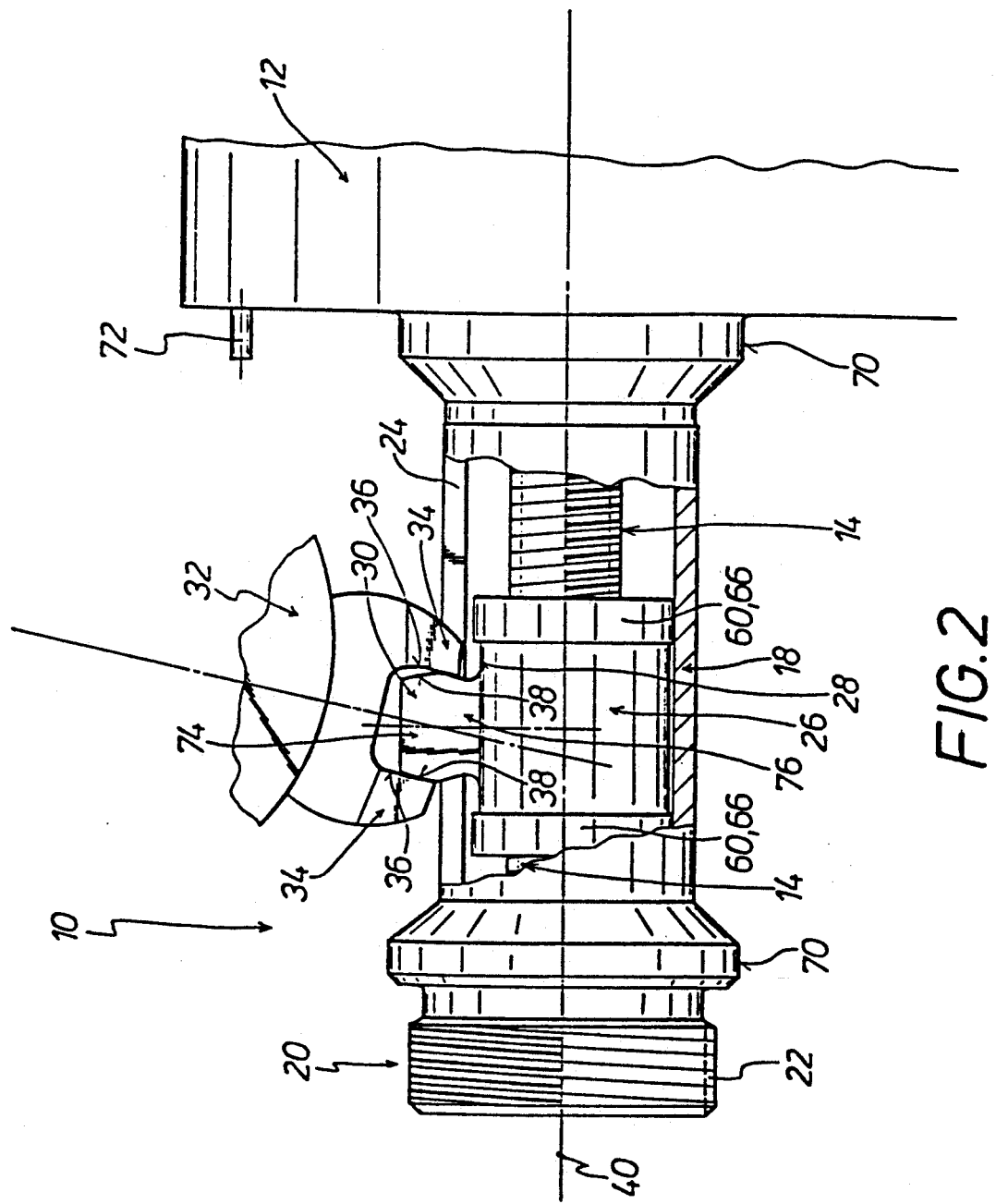
FIG. 2 illustrates a view similar to that of FIG. 1 of a modified exemplary embodiment of the setting device.

From FIG. 2 there can be ascertained that the bearing flange of the drive motor; in essence, the sleeve 18, possesses two axially short cylindrical casing or mantle surfaces 70. These two cylindrical mantle surfaces 70 serve for centering purposes. Provided as a security against rotation is a cylinder pin 72 which projects into the motor block.

The centering diameter of the cylindrical mantle surfaces 70 is dimensioned in such a manner, that the extension 30 which projects radially from the nut 26 will not project beyond the two cylindrical mantle or jacket surfaces 70. The drive motor being constructed as a submodule, which also incorporates the traveling nut 26 and the motor bearing, is thereby simply installable and exchangeable in a modular manner.

In comparison with an involute gearing or a worm-gear drive, there are inventively obtained the following advantages:

The axial distance between the motor shaft and the shaft for the control surface does not in any manner influence the possible play during the turning between the sides 38 or the degree of efficiency of the drive coupling. Particularly for a worm gear drive, any minor change in the axial distance already leads to either a jamming or to an unacceptable excess amount of play. In comparison with worm gear drives there is also inventively possible to obtain much lower component tolerances which are economical from a manufacturing standpoint. This additionally signifies that no problems are encountered when due to higher encountered forces from the air in the supersonic range, the housing parts and thus the position of the mentioned axis are displaced relative to each other due to elastic deformation.

Furthermore, it is possible that one and the same drive unit; in essence, one and the same electrical motor, can be employed in control surface setting devices, or respectively, setting or positioning systems possessing different axial spacings which are necessitated through different external dimensions of the airborne body. Only the control surface shaft 32 must be correlated with the respective system. Thus, when is intended to provide such a structural modular system then the size of the radius which determines the rolling side 38, is to be correlated with the smallest axial distance or, respectively, the widest control surface setting angle. As a result, there is determined the largest head end rounding for the extension 30. The control surface adjustment angle of the extension 30 also determines the necessary size of the undercutting angle.

Differing from an involute gearing, inventively only the extension 30 of the nut 26 possesses a complex side configuration; in essence, a complex shape of its complementary surfaces 38. The control rudder shaft 32 or, respectively, in effect, the two fingers 34 which form a bifurcation or yoke for the extension 30 are formed with simply producible, parallel complementary surfaces 38.

Moreover, the inventive setting system, when compared with a worm gear drive which is to be positioned in the same space, has substantially higher carrying capacity, in effect, bearing strength against any breaking of the roots of the gear teeth.

Through suitable dimensioning of the control surface shaft 32; in essence, the narrower width of the bifurcation cutout between the two fingers 34 and the extension 30, in effect, its trunnion width, the remaining turning-side play can be maintained to be extremely small. This, of course, is above all of importance in the inoperative position of the control surface-setting device 10 at a 0° angular positioning during the ballistic phase of flight in the supersonic range.

An almost uniformly remaining transition ratio over the entire setting range can be achieved through suitable selection and construction of the sides, and respectively, complementary surfaces 38 of the extension 30. Conversely, it is naturally also possible that the shape of the sides of the extension 30 be so selected that, with an increasing outward displacement, the transition ratio will increase. This can be advantageous, since for large control surface setting angles there must also be overcome maximum torques.

What is claimed is:

1. Setting device for the control surface of a projectile, including a drivable spindle; a nut secured against rotation having said spindle screwed therethrough, end stops arranged on said spindle secured against rotation and being axially adjustable along said spindle, each said end stop consisting of two mating parts so as to form a locknut structure for limiting the axial extent of displacement of the nut, each said end stop including a contact surface rotatable with the spindle so as to contact in the direction of rotational movement against a contact surface formed from a single screwthread and axially projecting from one or another opposite end surface of the nut, contact surfaces on the ends of the end stops facing said nut which are complementary to the contact surfaces of the nut and which, upon contact between one of the contact surfaces and complementary contact surface, engage with an adjacent end surface of the nut.

2. A setting device as claimed in claim 1, wherein the nut possess a threaded insert constituted from a friction-reducing material.

3. A setting device as claimed in claim 1, wherein the nut on the external mantle surface thereof includes a flange of a friction-reducing material, a sleeve which coaxially surrounds said spindle having an internal peripheral surface guided on said flange.

4. A setting device as claimed in claim 3, wherein a recess is formed in each end surface of said nut; each end stop having a projecting segment facing said nut which is engageable into an associated one of said recesses upon engagement between the respective contact surface and complementing contact surface.

5. A setting device as claimed in claim 4, wherein the nut includes a flange at each end surface encompassing said recess and having an end surface in which there is formed a helicoid surface bounded by the contact surface, and each said end stop including, rearwardly of a segment of a reduced diameter for insertion into the recess, a second segment attached radially externally thereto and possessing a helicoid surface and the contact surface.

6. A setting device as claimed in claim 3, wherein said sleeve includes an elongate slot extending in the longitudinal direction of said sleeve; and an extension radially projecting from said nut extending outwardly from said sleeve through said slot.

7. A setting device as claimed in claim 6, wherein the extension radially projecting through the sleeve is contacted by parallel surfaces on a finger extending from a control shaft in the region of spherical mating surfaces on said extension which each possess a radius which is larger than one-half the internal spacing between the parallel surfaces on the finger.

8. A setting device as claimed in claim 7, wherein the spherical mating surfaces are formed on an end section of said extension which is radially distant from the nut and which border said section in a direction towards the axis of the spindle and form a transition into an undercut of a connecting section with said nut.

9. A setting arrangement device as claimed in claim 1, wherein each end stop has said mating parts constructed as a two-part paired lock having an interposed damping element consisting of a deformable material.

* * * * *